(12) United States Patent
Stampfl et al.

(10) Patent No.: US 7,701,927 B2
(45) Date of Patent: Apr. 20, 2010

(54) METHOD FOR TRANSMITTING COMMUNICATION DATA IN A COMMUNICATION SYSTEM

(75) Inventors: Robert Stampfl, Hohenkammer (DE); Klaus Wille, München (DE); Steffi Winkler, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 824 days.

(21) Appl. No.: 10/984,711

(22) Filed: Nov. 9, 2004

(65) Prior Publication Data

US 2005/0111459 A1    May 26, 2005

(30) Foreign Application Priority Data

Nov. 25, 2003   (DE) ................................ 103 54 947

(51) Int. Cl.
   *H04L 12/66* (2006.01)
(52) U.S. Cl. ...................... 370/352; 370/353; 370/356; 370/384; 370/385; 370/395.2; 379/219; 379/225; 379/230
(58) Field of Classification Search ............... 370/395.2
See application file for complete search history.

(56) References Cited

U.S. PATENT DOCUMENTS

| | | | | |
|---|---|---|---|---|
| 6,134,235 | A * | 10/2000 | Goldman et al. ............. | 370/352 |
| 6,754,180 | B1 * | 6/2004 | Christie ...................... | 370/236 |
| 6,907,034 | B1 * | 6/2005 | Begis ......................... | 370/354 |
| 7,254,832 | B1 * | 8/2007 | Christie, IV ................. | 726/11 |
| 7,333,472 | B2 * | 2/2008 | Yang et al. .................. | 370/352 |
| 2002/0009071 | A1 * | 1/2002 | Yaary et al. ................. | 370/352 |
| 2002/0114320 | A1 * | 8/2002 | Ogren ........................ | 370/352 |
| 2002/0141386 | A1 * | 10/2002 | Minert et al. ................ | 370/352 |
| 2003/0002476 | A1 * | 1/2003 | Chung et al. ................ | 370/352 |
| 2003/0002485 | A1 * | 1/2003 | Emerson, III ............... | 370/352 |
| 2003/0048775 | A1 * | 3/2003 | Westermeier ............... | 370/352 |
| 2003/0055982 | A1 * | 3/2003 | Noro et al. .................. | 709/227 |
| 2004/0004957 | A1 * | 1/2004 | Rabipour et al. ............ | 370/352 |
| 2004/0008837 | A1 * | 1/2004 | Sylvain ................. | 379/265.09 |
| 2004/0028009 | A1 * | 2/2004 | Dorenbosch et al. ........ | 370/329 |
| 2004/0062230 | A1 * | 4/2004 | Taylor et al. ................ | 370/352 |
| 2006/0002381 | A1 * | 1/2006 | Socaciu ...................... | 370/352 |

* cited by examiner

*Primary Examiner*—Kamran Afshar
*Assistant Examiner*—German Viana Di Prisco

(57) ABSTRACT

The invention relates to a method for transmitting communication data in a communication system (CSY) between a calling first communication unit (IPPA) and a called second communication unit (IPPD), wherein, in a first step a primary connection is set up starting from the first communication unit (IPPA) via at least one node unit to the second communication unit (IPPD) with transmission of addressing data of the communication units (IPPA,IPPD) and node units participating in the setup of the primary connection. Following this, the first communication unit (IPPA) and/or a first node unit disposed along the primary connection which have a valid addressing data element are registered as the ingress node. Furthermore, the second communication unit (IPPD) and/or a last node unit disposed along the primary connection which have a valid addressing data element are registered as the egress node. With the embodiment of a secondary connection (DMC) between the egress and the ingress node via a network which is available in the communication system (CSY), communication data is finally transmitted via the secondary connection (DMC).

15 Claims, 11 Drawing Sheets

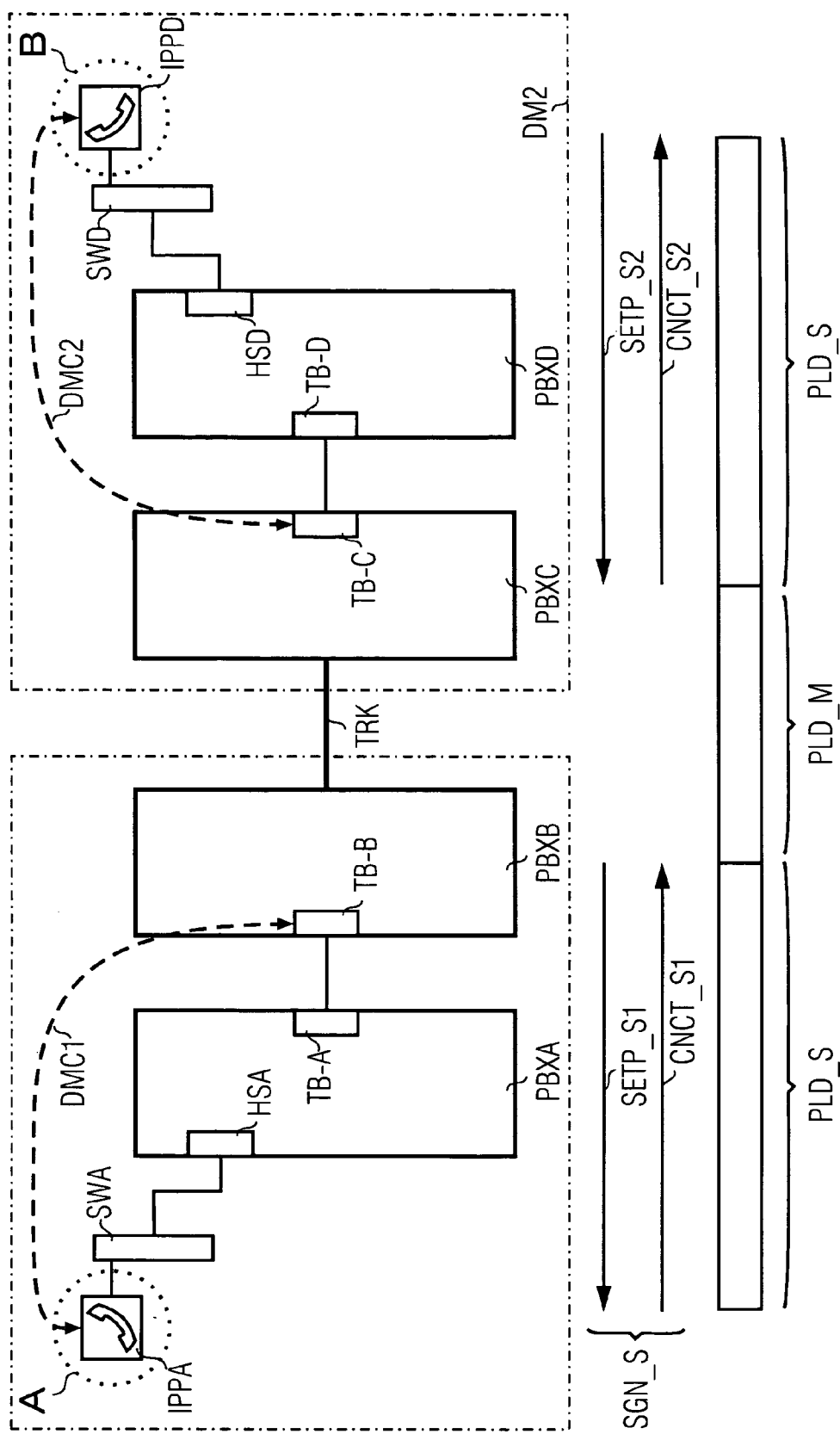

METHOD FOR TRANSMITTING COMMUNICATION DATA IN A COMMUNICATION SYSTEM

CROSS REFERENCE TO RELATED APPLICATIONS

This application claims priority to the German application No. 10354947.1 DE, filed Nov. 25, 2003 and which is incorporated by reference herein in its entirety.

FIELD OF INVENTION

The invention relates to a method for transmitting communication data in a preferably heterogeneous communication system.

BACKGROUND OF INVENTION

In contemporary communication systems it is known how to transmit user data, e.g. for voice or video communication, both by means of what is known as a circuit-switched technology and also via packet-oriented networks. Communication systems which support both a packet-oriented and a circuit-switching transmission technology are referred to in the following as >>convergent<< communication systems. As a result of the use of packet-oriented data transmission methods for communication systems of this type there are frequently losses in the quality of the user data to be transmitted, which losses are due primarily to an alternating conversion between a continuous user data stream and user data packets.

Taking the example of the commonly employed >>Internet Protocol<<, also referred to by the abbreviation IP, communication terminals which operate on the basis of a packet-oriented transmission technology will also be referred to in the following using the term >>IP communication unit<<. In the packet-oriented transmission of user data, for example voice data, the term >>Voice over IP<<, abbreviated to VoIP, is also current.

A convergent communication system typically comprises at least one communication device by means of which, through the use of suitable line/trunk modules, both IP communication terminals and >>classical<< communication terminals, i.e. communication terminals operating according to the circuit-switching principle, can be connected. In this case the communication devices are typically connected to one another and to further, what are referred to as >>remote<< units which for their part make a contribution toward switching and connection control.

In order to handle the conversion between circuit-oriented and packet-oriented transmission technologies, devices known as gateways can also be used in a convergent communication system. In this case a gateway performs a conversion between packet-oriented and circuit-oriented transmission technologies and is frequently disposed between a packet-oriented network and a communication device operating according to a circuit-switching method. Alternatively or in addition, subscriber modules and/or line/trunk modules of the communication devices as well as what are known as >>remote units<< are provided with functions of a gateway.

For remote units, communication devices and also for devices which take part as independent units in a call setup or switching operation in addition to the aforementioned units, the term >>node unit<< will also be used in the course of a more general description.

Furthermore, the term >>communication unit<< using in the following description includes terminals generally involved in a communication, such as e.g. VoIP communication terminals, analog as well as mobile or, as the case may be, cordless telephones, but also data terminals such as computer systems, mobile digital assistants, etc.

A convergent communication system is frequently characterized by a structuring into individual subnetworks, typically with each subnetwork being administered by a communication device or by a remote unit which, for the purpose of transmitting user or, as the case may be, signaling data, operate-according to a different transmission method depending on the respective necessary packet-oriented or circuit-oriented form of connection of the connected communication terminals.

In many cases a number of conversions, each time into the transmission method supported by the respective subnetwork, are necessary for a communication connection between two communication terminals that extends across several subnetworks using heterogeneous transmission methods. Said multiple conversions result in a loss in quality of the user data to be transmitted between the two communication terminals taking part in the connection.

SUMMARY OF INVENTION

The object of the invention is to provide means through the use of which a loss in quality during a transmission of user data between heterogeneous transmission methods is reduced.

Said object is achieved by means of a method with the features recited in the claims.

The method according to the invention for transmitting communication data in a communication system between a calling first communication unit and a called second communication unit provides firstly a setup of a primary connection. Said primary connection is set up starting from the first communication unit via at least one node unit to the second communication unit, whereby addressing data is contained in the message addressing data of the communication units and node units participating in the setup of the primary connection, said message addressing data being used for setting up the primary connection, and is transmitted together with control messages for setting up the primary connection. The primary connection is set up from the first communication unit via at least one node unit to the second communication unit, with the number of node units included for the primary connection being dependent on the network structure. An ingress node is registered with the aid of the transmitted addressing data of the communication unit involved in the setting up of the primary connection.

The ingress node is defined by the first necessary conversion from circuit-oriented to packet-oriented communication data along the primary connection. The egress node is defined by the last necessary conversion from packet-oriented to circuit-oriented communication data along the primary connection.

In this case the ingress node is the first unit with a valid addressing data element, i.e. the first communication unit having a valid addressing data element itself or the first node unit having a valid addressing data element. In other words, in the event that the first communication unit has a valid addressing data element, then said first communication unit is registered as the ingress node. In this case a valid addressing data element is, for example, the provision of a communication unit or, as the case may be, node unit having a network address under which the communication unit or, as the case may be, node unit can be addressed by a—for example packet-oriented—network. In an analogous manner, a last node unit having a valid addressing data element and disposed along the primary connection or, as the case may be, the second communication unit itself—provided it has a valid addressing data element—is registered as the egress node. Provided as the last method step is the embodiment of a secondary connection between the previously registered ingress node and egress node via a network that is available in the communication system. The communication data—in particular user data—is thereupon transmitted via the secondary connection.

A significant advantage of the method according to the invention is to be seen in the fact that a transmission of communication data via the secondary connection is effected directly, that is to say without the involvement of a plurality of node units and consequently necessary conversions. The secondary connection is realized here for example via a packet-oriented network, as a result of which a multiple conversion of the user data packets or, as the case may be, user data stream in a heterogeneous communication system comprising both node units operating according to a circuit-switching transmission technology and node units operating according to a packet-oriented transmission technology is avoided in that a short path via the secondary connection is selected without an involvement of a plurality of node units.

A further advantage of the method according to the invention consists in the choice of the ingress or, as the case may be, egress node. In the method according to the invention it is provided here that the ingress node is located as near as possible to the calling first communication unit and, analogously, the egress node is located as near as possible to the called second communication unit. In a choice of a packet-oriented transmission method for the secondary connection, multiple conversions along the length of the secondary connection can thus be avoided. The packet-oriented transmission method is maintained without any further conversion along the secondary connection as far as the egress node. In a transmission of communication data, for example in the form of voice, a substantial improvement in the voice quality both at the calling first and the called second communication unit can be observed as a result of the use of the method according to the invention.

Advantageous developments of the invention can be derived from the claims.

After the setup of the secondary connection the latter is advantageously maintained in addition to the primary connection. While communication data can be exchanged between the ingress and the egress node via the secondary connection, whereby this exchange produces a rise in quality in the above-described manner in particular in an exchange of user data, the primary connection maintained in parallel offers the advantage that in the event of a change in the call processing status, e.g. in the event of an inquiry call initiated by the calling subscriber, a switching-oriented controller of the node units, in particular communication devices, involved in the primary connection can be called upon in order to execute a corresponding service feature such as the inquiry call mentioned.

The service feature control is implemented in an advantageous manner by a communication device assigned in each case to the communication unit via signaling data of the primary connection.

The method according to the invention is applied in an advantageous manner to heterogeneous communication systems, i.e. systems comprising a circuit-oriented and a packet-oriented transmission technology. In a heterogeneous communication system the primary connection is implemented on a connection sublink between two node units or, as the case may be, between a node unit and a communication unit in accordance with the connection type of the node units or, as the case may be, communication units. In this case the connection type of the node unit or, as the case may be, communication unit is either circuit-oriented or packet-oriented, which means that a conversion between circuit-oriented communication data or, as the case may be, communication data packets is required between heterogeneous node units. Using the method according to the invention, the increase in quality of the transmitted communication data in the case of a heterogeneous communication system is considerable.

Advantageously, a check is first made on the basis of configuration data of a node unit involved in the setup of the primary connection to determine whether the further setup of the secondary connection with the inclusion of said node unit is permitted. The configuration data is provided for example at the respective node unit. In cases in which an inclusion of the current node unit for a further setup of the secondary connection is not provided, even though further node units are included in the primary connection, the secondary connection is provided in the form of two connection sublinks, whereby the first connection sublink ends at the node unit acting as the egress node and the second sublink begins at an ingress node disposed after the node unit. In an analogous manner the secondary connection is subdivided into further connection sublinks as necessary.

BRIEF DESCRIPTION OF THE DRAWINGS

An exemplary embodiment with further advantages and developments of the invention will be explained in more detail below with reference to the drawing, in which:

FIG. 7B: is a flow diagram for representing an exchange of control messages in a communication system subdivided into subnetworks for the embodiment of a secondary connection.

DETAILED DESCRIPTION OF INVENTION

Figure 1:
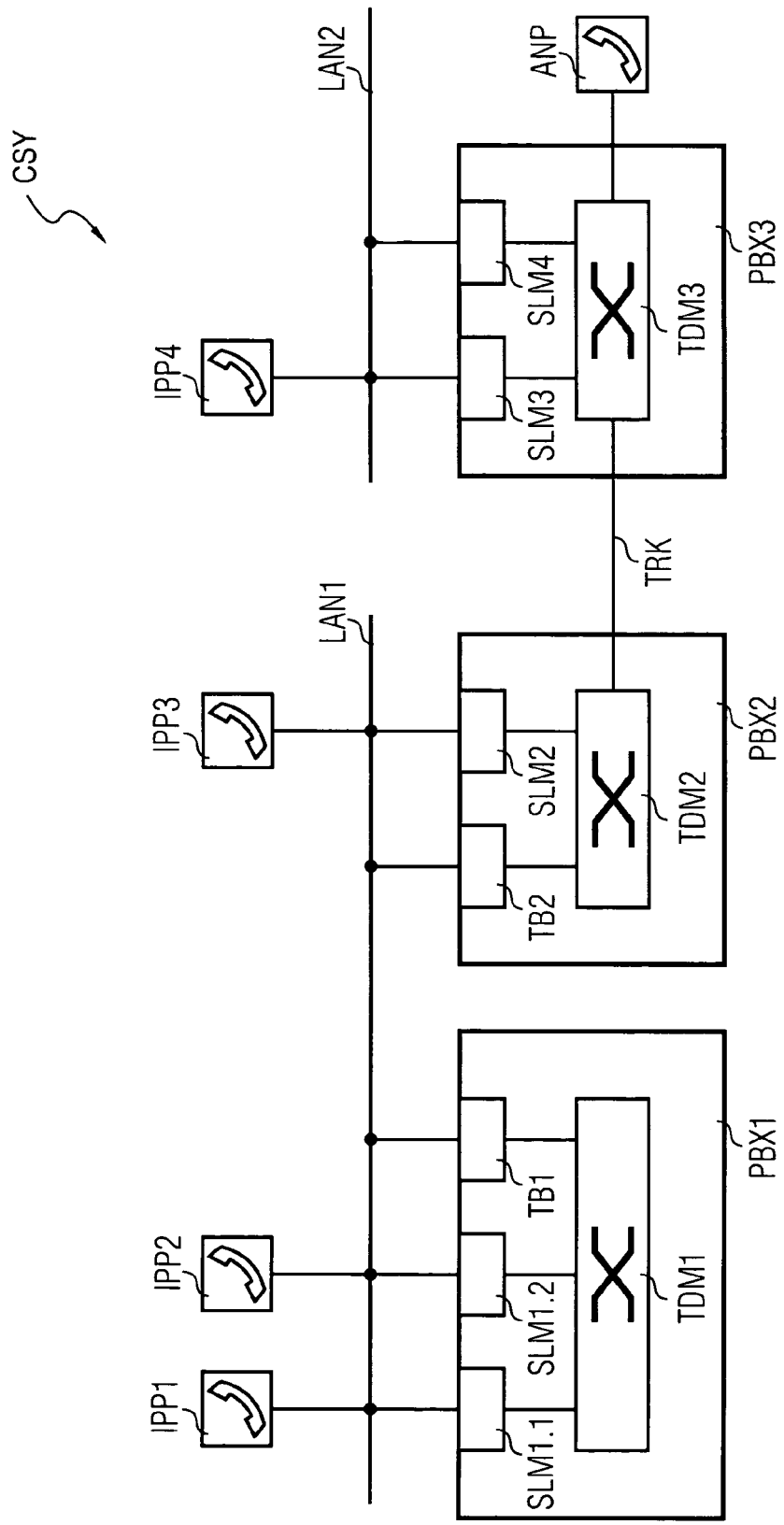
FIG. 1: is a structure diagram for schematically representing a communication system.

FIG. 1 shows a communication system CSY comprising an extract of functional components essential to the invention. Node units in the form of a first communication device PBX1, a second communication device PBX2 and a third communication device PBX3 are a major component of the communication system CSY.

The communication devices PBX1,PBX2,PBX3 operate internally according to a timeslot-oriented switching principle—often referred to in technical circles as >>Time Division Multiplex<<(TDM)—and accordingly have a corresponding respective switching matrix TDM1,TDM2,TDM3.

The communication devices PBX1,PBX,PBX3 are in each case embodied with a circuit-switching switching matrix TDM1,TDM2,TDM3 and in each case connected both to one another and to a packet-oriented network.

The first and the second communication device PBX1, PBX2 are connected to a first packet-oriented network segment LAN1. The first packet-oriented network segment LAN1 is embodied alternatively as an intranet, corporate network, as a domain of a larger network or also as part of a global data network such as, for example, what is known as the World Wide Web (WWW).

The third communication device PBX3 is connected to a second packet-oriented network segment LAN2. What was said in relation to the first packet-oriented network segment LAN1 also applies with regard to the embodiment of the second packet-oriented network segment LAN2.

The first communication device PBX1 is connected to the first packet-oriented network segment LAN1 via a connection module TB1. Similarly, the second communication device PBX2 is connected to the first packet-oriented network segment LAN1 via a second connection module TB2.

The connection modules TB1,TB2 of the corresponding communication devices PBX1,PBX2 serve to exchange packet-oriented communication data between the two communication devices PBX1,PBX2 via the packet-oriented network segment LAN1 and like the communication devices PBX1,PBX2,PBX3 belong to the category of node units.

The second communication device PBX2 is connected to the third communication device PBX3 via a trunk line TRK. In contrast to a connection via the connection modules TB1, TB2 over the first packet-oriented network segment LAN1, a circuit-oriented cross-connection is provided between both communication devices PBX2,PBX3 for a transmission via the trunk line TRK between the second communication device PBX2 and the third communication device PBX3.

Several communication units IPP1,IPP2,IPP3,IPP4,ANP are represented by way of example as a further component of the communication system CSY. A first VoIP communication terminal IPP1 is connected to the first communication device PBX1 via the first packet-oriented network segment LAN1 as well as via a first subscriber line module SLM1.1 of the first communication device PBX1.

A second VoIP communication terminal IPP2 is connected to the first communication device PBX1 via the first packet-oriented network segment LAN1 as well as via a second subscriber line module SLM1.2 of the first communication device PBX1.

Similarly, a third VoIP communication terminal IPP3 is connected to the second communication device PBX2 via the first packet-oriented network segment LAN1 by means of a second subscriber line module SLM2.

A further, fourth, VoIP communication terminal IPP4 is connected to the third communication device PBX3 via the second packet-oriented network segment LAN2 by means of a third subscriber line module SLM3 of the third communication device PBX3.

A further communication terminal ANP is connected on a circuit-oriented basis to the third communication device PBX3. Said further communication terminal ANP is, for example, an analog telephone.

The subscriber line modules SLM1.1,SLM1.2,SLM2, SLM3 perform a bidirectional conversion between a transmission taking place on a packet-oriented basis in the direction of the VoIP communication terminals and a transmission taking place on a circuit-oriented basis internally inside the communication devices PBX1,PBX2,PBX3.

The subscriber line modules SLM1.1,SLM1.2 are connected on a circuit-oriented basis to the first switching matrix TDM1 in the interior of the first communication device PBX1. Similarly, the second subscriber line module SLM2 is connected to the second switching matrix TDM2 as a component of the second communication device PBX2, and the third subscriber line module SLM3 is connected internally to the third switching matrix TDM3 of the third communication device PBX3.

A conversion between packet-oriented and circuit-switching communication data as described previously is not provided for the communication terminal ANP connected on a circuit-oriented basis. Although in technical implementations the communication terminal ANP is likewise connected to the third communication device PBX3 via a subscriber line module (not shown), in the interests of an intelligible representation a direct —i.e. without provision of a conversion—circuit-oriented connection of the communication terminal ANP to the third switching matrix TDM3 is depicted in the drawing.

With regard to the structure of the communication system CSY it should be noted that a connection between the first and the second communication device PBX1,PBX2 is implemented via the respective connection module TB1,TB2 and the first packet-oriented network segment LAN1. Since the second packet-oriented network segment LAN2 has no logical connection to the first packet-oriented network segment LAN1, a cross-exchange of communication data between the second communication device PBX2 and the third communication device PBX3 can therefore be performed solely via the trunk line TRK.

An exchange of communication data between a calling and a called communication terminal will be explained in more detail below with further reference to the functional units shown in FIG. 1.

Figure 2A:
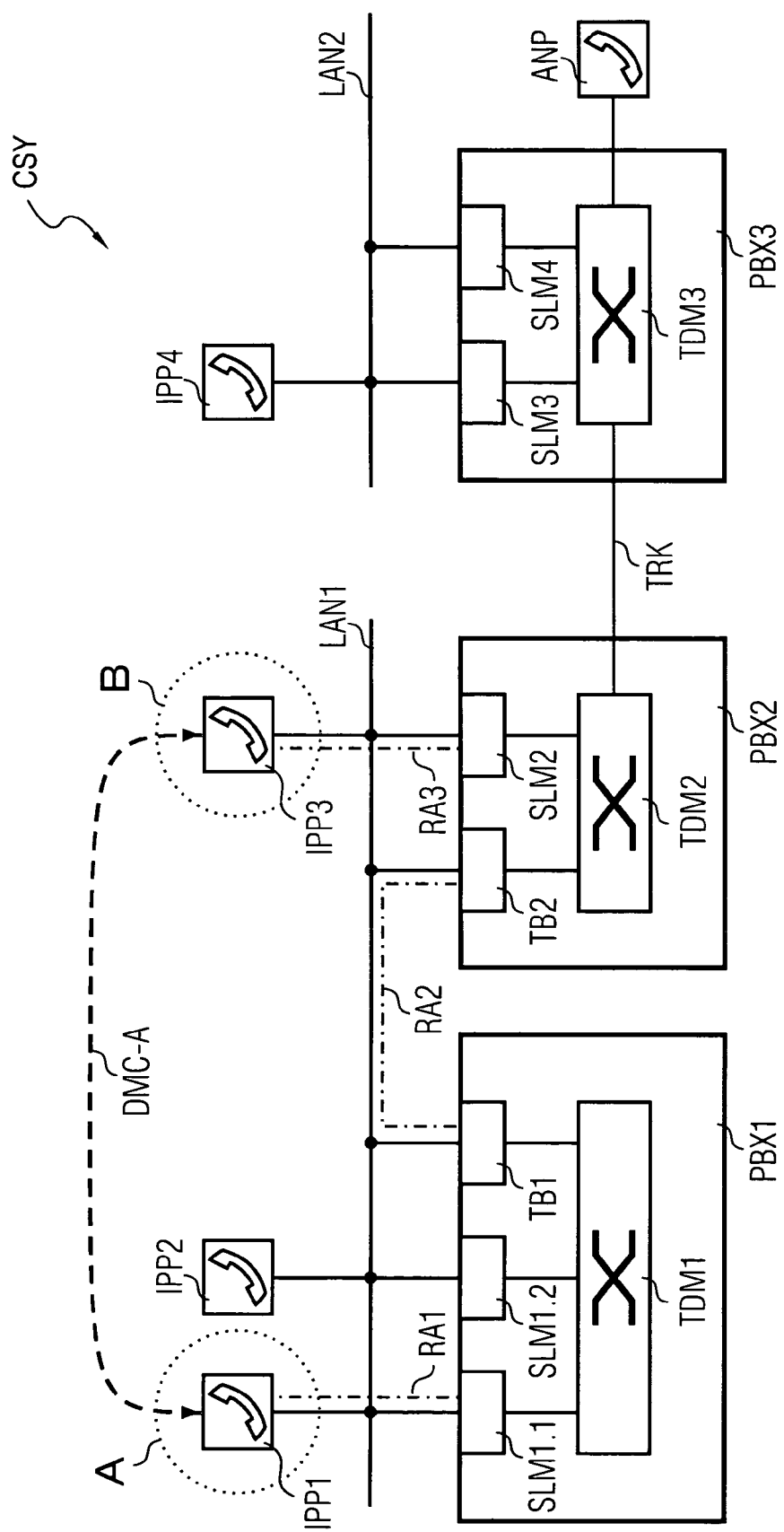
FIG. 2A: is a structure diagram for schematically representing a transmission of communication data in a first application scenario.

FIG. 2A shows a structure diagram for schematically representing a transmission of communication data in a first application scenario. In this first application scenario, a primary communication connection is set up between a calling subscriber A at the first communication terminal IPP1 and a called subscriber B at the third VoIP communication terminal IPP3.

The primary communication connection is set up starting from the first VoIP communication terminal IPP1 via a first connection path RA1 to the first subscriber line module SLM1.1 of the first communication device PBX1. In the first subscriber line module SLM1.1, packet-oriented communication data of the first VoIP communication terminal IPP1 is converted into circuit-oriented communication data and supplied to a first switching matrix TDM1 of the first communication device PBX1. In a switching and service feature control unit (not shown) of the first communication device PBX1, a communication subscriber to be switched is determined on the basis of the communication data and further connection paths set up accordingly.

In the present case the third VoIP communication terminal to be called is administered by another, the second communication device PBX2. After exiting the switching matrix TDM1 the communication connection is routed on a second connection path RA2 via the first connection module TB1 and over the first packet-oriented network segment LAN1 to the second communication device PBX2. The second connection path RA2 is implemented via a second connection module TB2 of the second communication device PBX2, with a bidirectional conversion again taking place between packet-oriented and circuit-switching communication data. Following this conversion, the connection path is routed further to the second switching matrix TDM2, in which a circuit-oriented switching operation is performed to the second subscriber line module SLM2. In the second subscriber line module SLM2, the circuit-oriented communication data is again converted into packet-oriented communication data and switched through via the third connection path RA3 or, as the case may be, the first packet-oriented network segment LAN1 to the third VoIP communication terminal IPP3 and therefore to the called subscriber B. The routing or, as the case may be, conversion of the communication data hitherto described in the direction from the calling to the called subscriber A,B is performed analogously in the reverse direction.

Following the successful setup of the primary connection via the connection paths RA1,RA2,RA3, a user data exchange takes place between the calling subscriber A and the called subscriber B on this connection path. On the primary connection path, communication data—including the user data—is converted a total of six times between a packet-oriented and a circuit-oriented format. These conversions are performed in each case in the VoIP communication terminals IPP1,IPP3 themselves as well as in each case in the subscriber line modules SLM1.1,SLM2 and in the connection modules TB1,TB2. With this number of conversions, a considerable loss of quality in the user data is to be observed.

In order to avoid multiple conversions between a packet-oriented and a circuit-switching format, the method according to the invention provides a direct media linkage between the calling subscriber A and the called subscriber B. The direct media linkage, also referred to as >>Direct Media Connection<<, abbreviated to DMC, takes place on the path of a secondary connection DMC-A which transmits packet-oriented communication data directly between the first and the third VoIP communication terminal IPP1,IPP3.

With regard to the format of the signaling data exchanged in the form of data packets on the secondary connection, use can be made of, for example, the SIP standard, the H.323 standard or other protocols for the provision of a transmission of communication data in packet-oriented networks—>>Voice over IP<< or, as the case may be, VoIP.

SIP (Session Initiation Protocol) is a standard proposed by the Internet Engineering Task Force (IETF) for the signaling of connections via packet-oriented networks and is employed today predominantly in the field of Internet telephony as well as for further services such as conference interactions, event notification, message transmission, etc.

The H.323 standard is an international ITU-T standard (ITU-T=International Telecommunication Union—Telecommunication Standardization Sector) for voice, data and video communication over packet-oriented networks which guarantees interoperability of the vendor products with one another.

Although the use of the Internet Protocol is the preferred means of choice with a very widespread popularity, the invention is not restricted to the use of this protocol.

In a general case the secondary connection DMC-A is routed from a node unit or, as the case may be, communication unit located as near as possible to the calling subscriber A to a communication unit or, as the case may be, node unit located as near as possible to the called subscriber B.

In the present case the communication terminals IPP1, IPP3 assigned to the calling or, as the case may be, called subscriber A,B have a valid addressing data element, i.e., they can be addressed from the first packet-oriented network segment LAN1 by any communication partner with a knowledge of their network address.

Following the setup of the secondary connection DMC-A (to be described in detail later), the endpoints—i.e. the first and the third VoIP communication terminal IPP1,IPP3—of this secondary connection DMC-A send and receive user data exclusively via this secondary connection DMC-A, whereas no more user data is transmitted via the primary connection with the participation of the first and second communication device PBX1,PBX2 and the connection paths RA1,RA2, RA3.

However, this primary connection is maintained during the existence of the secondary connection DMC-A in order to be able where necessary, e.g. in the case of an inquiry call initiated by the calling subscriber, to make use of switching services or, as the case may be, service features of the communication devices PBX1,PBX2.

Figure 2B:
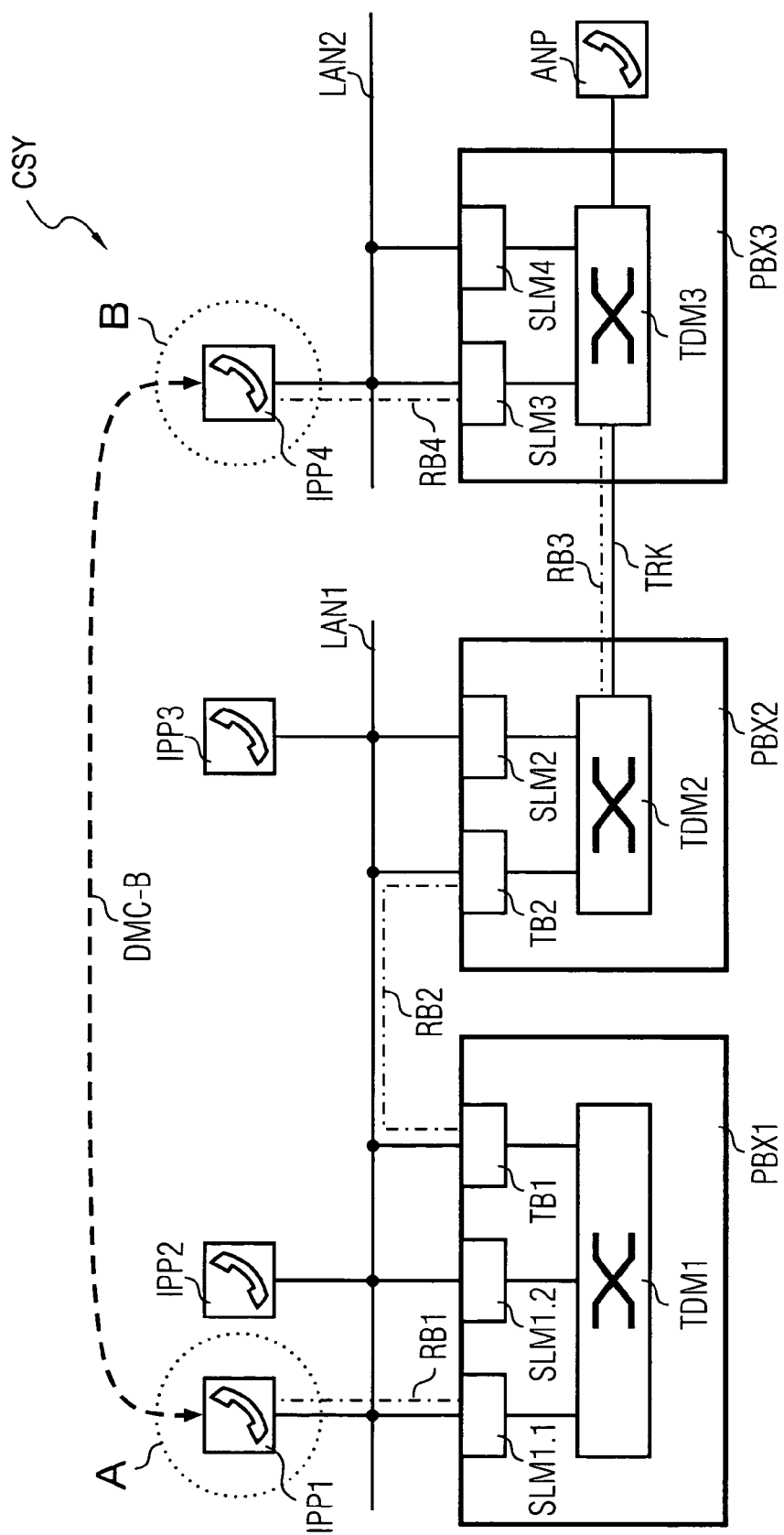
FIG. 2B: is a structure diagram for schematically representing a transmission of communication data in a second application scenario.

FIG. 2B shows a structure diagram for schematically representing a transmission of communication data in a second application scenario. Said second application scenario differs from the aforementioned first application scenario essentially due to the fact that this time the called subscriber B is located at the fourth VoIP communication terminal IPP4 controlled by the third communication device PBX3.

As explained already, the third communication device PBX3 is connected to the second packet-oriented network segment LAN2. Because of this logical segmentation and respective administration by the communication devices PBX1,PBX2,PBX3, no packet-oriented connection is therefore provided between the third communication device PBX3 and the first communication device PBX1 via a common network (not shown).

Consequently, the primary connection between the calling subscriber A and the called subscriber B is set up in an initially identical manner to the first application scenario via a first connection path RB1 to the first communication device PBX1, and via a second connection path RB2 to the second communication device PBX2; in contrast to the first application scenario, however, the third connection path RB3 is implemented via the trunk line TRK, and therefore in a circuit-oriented manner, to the third switching matrix TDM3 of the third communication device PBX3. The primary connection runs further via a fourth connection path RB4 from the third subscriber line module SLM3 via the second packet-oriented network segment LAN2 to the fourth VoIP communication terminal IPP4.

In spite of an organizational or, as the case may be, logical subdivision into individual network segments LAN1,LAN2, said network segments LAN1,LAN2 are not physically separated from each other. The subdivision into individual network segments or, as the case may be, domains corresponds to an administrative assignment to the individual communication devices PBX1,PBX2,PBX3, whereby it is assumed in each case in the following that a connection established without the participation of the communication devices PBX1, PBX2,PBX3 between communication endpoints between the different network segments LAN1,LAN2 is to be set up via a common—not shown—network.

Because of the packet-oriented connection method of the participating VoIP communication terminals IPP1,IPP4, the secondary connection DMC-B corresponding to the previously described primary connection is implemented directly between the aforementioned communication terminals IPP1, IPP4.

Figure 2C:
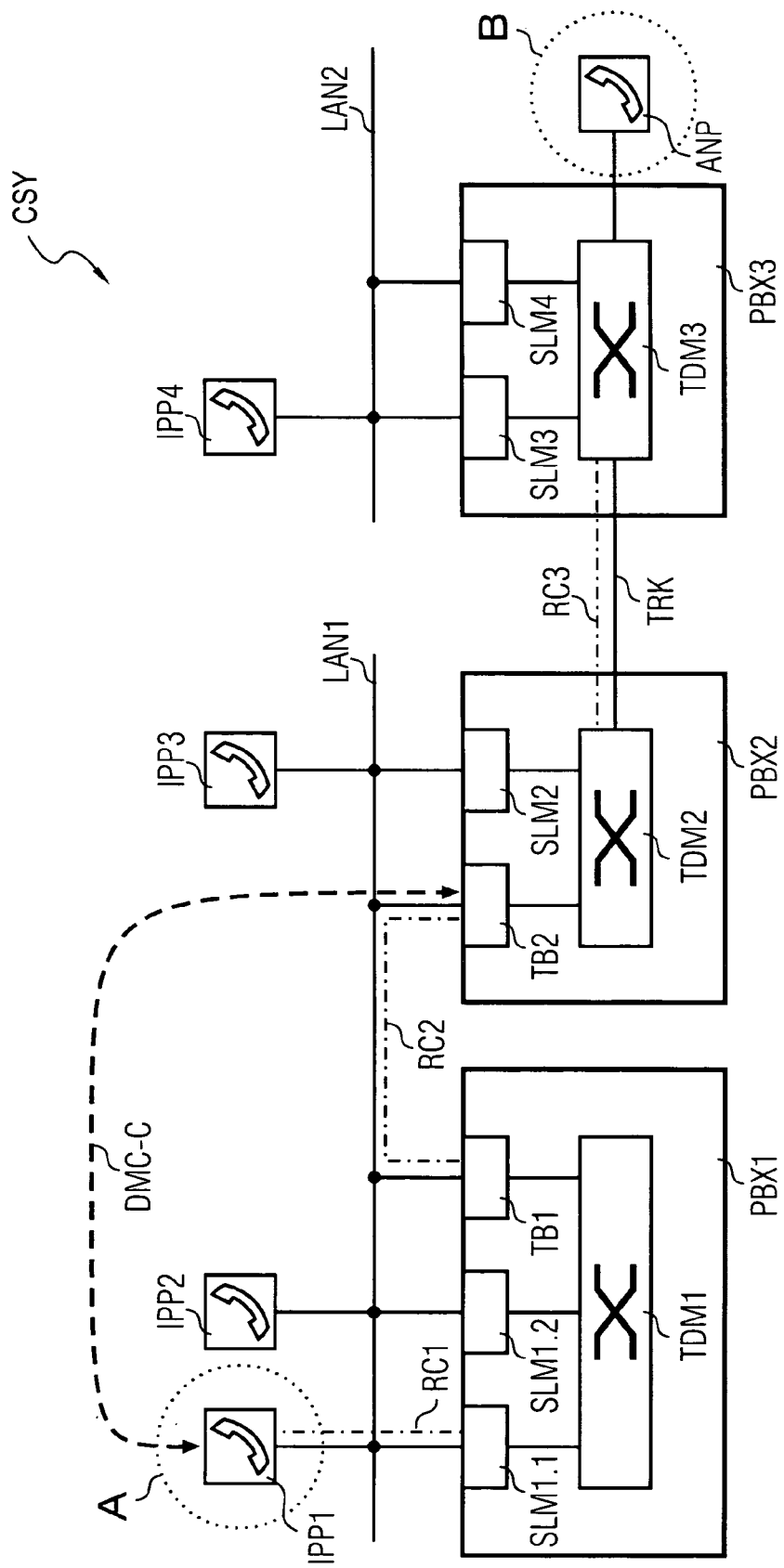
FIG. 2C: is a structure diagram for schematically representing a transmission of communication data in a third application scenario.

FIG. 2C shows a structure diagram for schematically representing a transmission of communication data in a third application scenario. In this third application scenario the called subscriber B is located at a communication terminal ANP which does not have a valid addressing data element; the communication terminal ANP of the called subscriber B is therefore, for example, an analog telephone.

In this case a direct media connection between the calling subscriber A and the called subscriber B is not possible. In this case the secondary connection DMC-C again starts from the calling subscriber A, but ends at the second connection module TB2, i.e. the node unit, which, along the primary connection, is the node unit located nearest to the called subscriber B having a valid addressing data element.

The primary connection set up before the secondary connection and maintained in parallel thereto is established starting from the calling subscriber A via the latter's assigned VoIP communication terminal IPP1 via a first connection path RC1 to the first subscriber line module SLM1.1 of the first communication device PBX1, via the latter's first switching matrix TDM1 to the first connection module TB1 and further via a second connection path RC2 from the first connection module TB1 to the second connection module TB2 of the second communication device PBX2, from where it reaches the communication terminal ANP via the second switching matrix TDM2 via the trunk line TRK to the third switching matrix TDM3 of the third communication device PBX3 and finally via a subscriber line.

The communication devices PBX1,PBX2,PBX3 as well as their subscriber line modules SLM1.1,SLM1.2,SLM2,SLM3 and their connection modules TB1,TB2 are to be regarded according to the nomenclature used in this description as node units having a valid addressing data element, i.e., each circuit-oriented-to-packet-oriented-converting node unit is characterized by a valid addressing data element.

Figure 3:
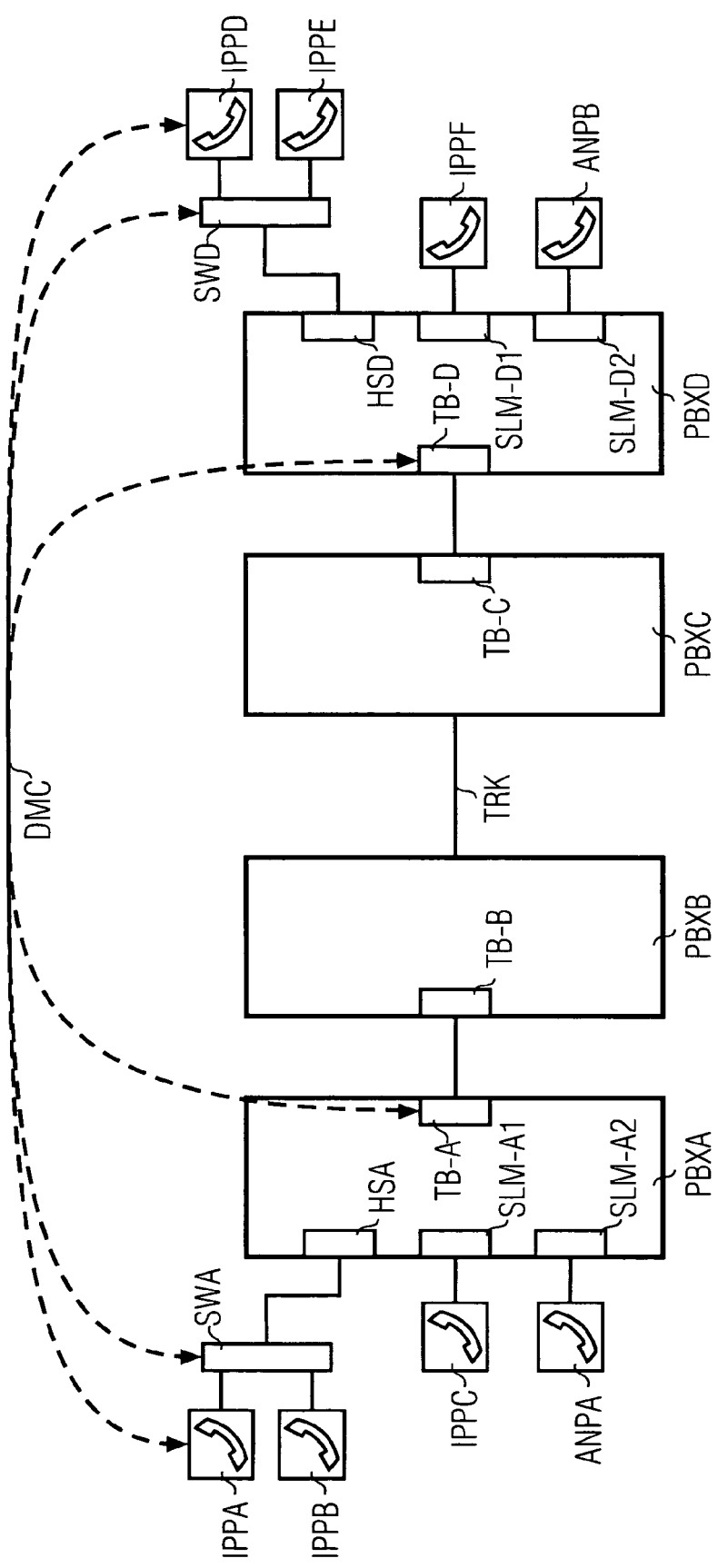
FIG. 3: is a structure diagram for schematically representing an efficient arrangement of a secondary connection.

FIG. 3 shows a communication system which, compared with the preceding figures, has a modified structure for schematically representing an efficient arrangement of a secondary connection.

The communication system comprises a plurality of communication units, specifically a first VoIP communication terminal IPPA, a second VoIP communication terminal IPPB, a third VoIP communication terminal IPPC, a fourth VoIP communication terminal IPPD, a fifth VoIP communication terminal IPPE, a sixth VoIP communication terminal IPPF, as well as a first communication terminal ANPA and a second communication terminal ANPB. The last-mentioned communication terminals ANPA,ANPB have no valid addressing data element and are embodied, for example, as analog telephones.

The communication system further comprises four partially interconnected communication devices PBXA,PBXB, PBXC,PBXD. The communication devices PBXA,PBXB, PBXC,PBXD operate according to a timeslot-oriented switching principle often referred to in technical circles as >>Time Division Multiplex<< (TDM)—and accordingly have a corresponding switching matrix. For reasons of clarity the respective switching matrix provided in the communication devices PBXA,PBXB,PBXC,PBXD is not depicted in the drawing.

The first and the second VoIP communication terminal IPPA,IPPB are connected to the first communication device via a first switch SWA. In the same way, the fourth and the fifth VoIP communication terminal IPPD,IPPE are connected to the fourth communication device PBXD via a second switch SWD.

The two switch units SWA,SWD each have a valid addressing data element and are likewise to be regarded as node units. The first switch SWA is connected to the associated first communication device PBXA via, for example, a packet-oriented network (not shown) having a host switch HSA integrated in the first communication device PBXA. In the same way, the second switch SWD is connected to the fourth communication device PBXD via a second host switch HSD.

The remaining communication units connected to the first communication device PBXA, namely the third VoIP communication terminal IPPC and the first communication terminal ANPA, are connected in each case via subscriber line modules SLMA1,SLM-A2. In the same way, the sixth VoIP communication terminal IPPF and the second communication terminal ANPB are connected to the fourth communication device PBXD via a respective subscriber line module SLM-D1,SLM-D2.

A, for example, packet-oriented cross-connection between the first and the second communication device PBXA,PBXB is implemented via the first connection module TB-A or, as the case may be, via the second connection module TB-B, with said connection modules TB-A,TB-B being integrated into the respective communication devices PBXA,PBXB.

The second communication device PBXB is connected to the third communication device PBXC via a circuit-oriented trunk line TRK.

A third connection module TB-C of the third communication device PBXC connects the latter to a fourth connection module TB-D of the fourth communication device PBXD. The two switch units SWA,SWD as well as their associated host switch HSA,HSD are to be regarded, like the connection modules TB-A,TB-B,TB-C,TB-D, as node units in the context of what has been said in the foregoing.

FIG. 3 shows several possible embodiments of a secondary connection DMC between the first VoIP communication terminal IPPA and the fourth VoIP communication terminal IPPD. Several possibilities for the embodiment of the secondary connection DMC result depending on which node unit is located locally nearest to the calling or, as the case may be, called VoIP communication terminal IPPA,IPPD.

The ingress and egress node are determined on the basis of the valid addressing data during the connection setup of the primary connection.

The secondary connection advantageously runs from an egress node—i.e. from the called communication unit or from a last node unit disposed along the primary connection and having a valid addressing data element—to the ingress node—i.e. to the calling communication unit or to a first node unit disposed along the primary connection and having a valid addressing data element. In any mixed communication systems, this results in the different possibilities shown in FIG. 3 of a range of the secondary connection DMC. If the called and the calling VoIP communication terminals IPPD,IPPA have in each case as always assumed for VoIP communication terminals in this description—a valid addressing data element, a maximum range of the secondary connection DMC is given directly between the called and the calling VoIP communication terminals IPPD,IPPA. The other variations shown in FIG.

3 relate to cases in which the external communication units and node units have no valid addressing data element, in which the range of the secondary connection DMC is therefore correspondingly smaller.

On the other hand, to cover the situation where the calling VoIP communication terminal IPPA does not have a valid addressing data element, the secondary connection DMC begins at the first switch SWA, which is therefore the ingress node. Accordingly, the secondary connection DMC ends at the fourth switch SWD—egress node—in case the called fifth VoIP communication terminal IPPE does not have a valid addressing data element. As already explained, however, it is always assumed in the rest of the description that the VoIP communication terminals IPPA, IPPB,IPPC,IPPD,IPPE, IPPF each have a valid addressing data element.

Figure 4:
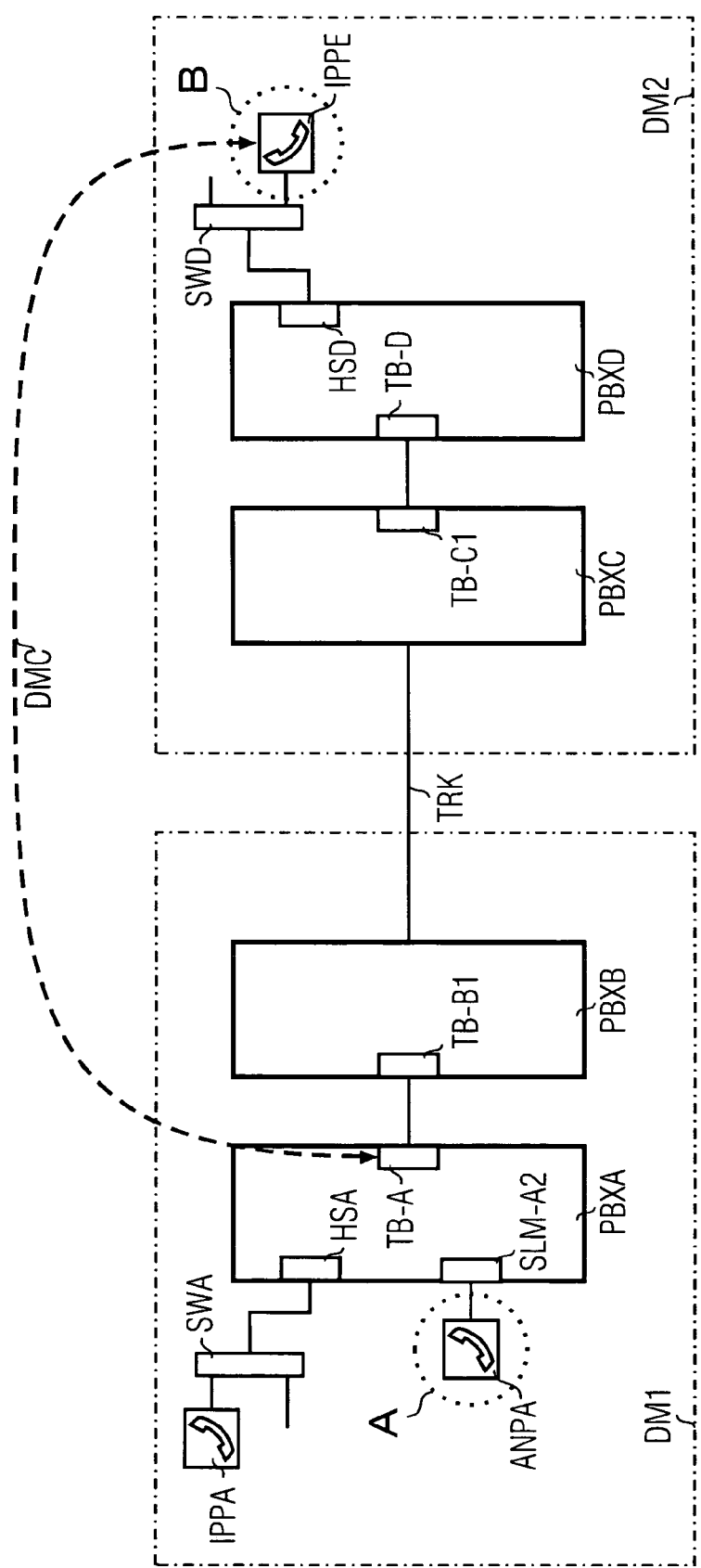
FIG. 4: is a structure diagram for schematically representing a transmission of communication data in a communication system subdivided into several subnetworks in a first embodiment.

FIG. 4 shows a structure diagram for schematically representing a transmission of communication data in a communication system subdivided into several subnetworks. The structure diagram in FIG. 4 uses the functional components known from FIG. 3 and necessary for the further description.

In a first implementation scenario it is assumed that the communication system is structured into a first domain DM1 and into a second domain DM2. In this case the domains DM1,DM2 correspond to a logical segmentation of the communication system, in the same way as they were also referred to in the preceding description in a physical form of expression as network segments.

In the following description, a connection is to be established between a calling subscriber A on the first communication terminal ANPA and a called subscriber B on the fifth VoIP communication terminal IPPE. Following the embodiment of the primary connection, a secondary connection DMC is established between the first connection module TB-A of the first communication device PBXA and the fifth VoIP communication terminal IPPE.

In this case the first connection module TB-A corresponds to the nearest node unit to the calling subscriber A having a valid addressing data element. The communication terminal ANPA itself is, as already mentioned, an analog telephone and accordingly does not have a valid addressing data element or, as the case may be, the possibility of a network connection.

It is assumed in the first implementation scenario according to FIG. 4 that the secondary connection DMC is embodied as a cross-domain connection, i.e. from a node unit of the first domain DM1 to a communication unit of the second domain DM2.

Figure 5:
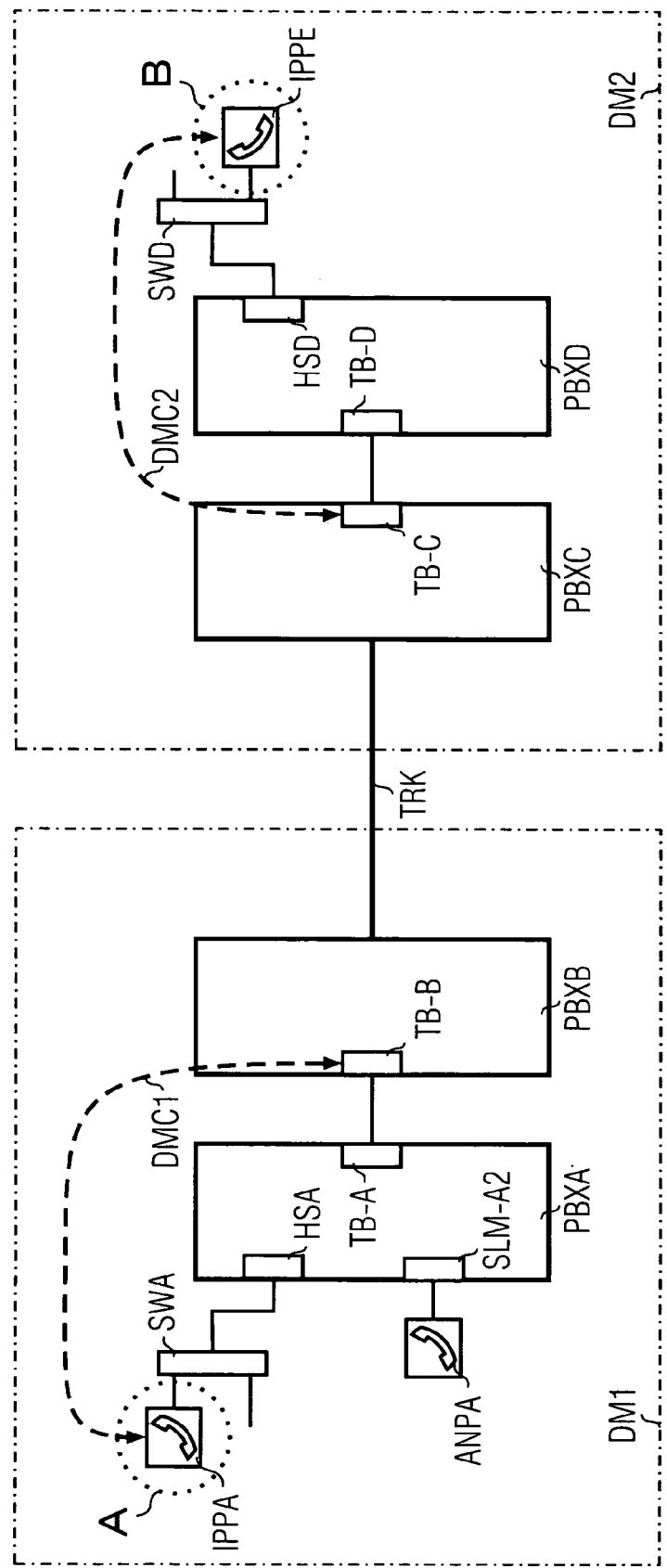
FIG. 5: is a structure diagram for schematically representing a transmission of communication data in a communication system subdivided into several subnetworks in a second embodiment.

FIG. 5 shows the communication system known from FIG. 4 in a second implementation scenario. Whereas the called subscriber B is again located at the fifth VoIP communication terminal IPPE, this time the calling subscriber is located at the first VoIP communication terminal IPPA.

Because of the fact that the first VoIP communication terminal IPPA has a valid addressing data element, this can also be included in the secondary connection. However, it is assumed in the second application scenario as shown in FIG. 5 that the secondary connection cannot be set up directly between the calling subscriber A and the called subscriber B since, because of certain restrictions in the communication system, no direct cross-domain connections may or, as the case may be, can be established between the first domain connections may or, as the case may be, can be established between the first domain DM1 and the second domain DM2.

In an embodiment of the primary connection, a check is made in this regard according to one embodiment of the method according to the invention at each node unit to determine whether the setup of the secondary connection is permitted with the inclusion of this node unit. In the present case it is noted at the second communication device PBXB as the domain boundary that the secondary connection may not be established beyond domain boundaries.

In the connection setup of the primary connection, the identifier "ingress node" including valid addressing data is deleted again so that an ingress node can be determined again in subsequent domains.

The secondary connection is subdivided into two connection sublinks DMC1,DMC2, whereby the first connection sublink DMC1 is embodied between the first VoIP communication terminal IPPA and the node unit preceding the second communication unit PBXB, i.e. the second connection module TB-B. Said node unit TB-B is consequently also referred to as an egress node.

One purpose of these aforementioned restrictions consists for example in an embodiment to be referred to in the widest sense as an >>LCR configuration<< between the second and the third communication device PBXB,PBXC. In an LCR (Least-Cost Routing) method, there is provided a form of connection routing which is based on network-specific rules and tailored to individual customer requirements such as, for example, voice quality, subscriber-dependent security devices, cost factors, bandwidth and/or availability.

A configuration of this type therefore goes beyond the literal meaning of an LCR configuration approach, since the connection path arrangement does not exclusively serve the purpose of a connection at the lowest possible cost. It does, however, correspond to general linguistic usage also to apply the term >>LCR configuration<< to the connection path arrangement for other reasons.

The restrictions cited therefore provide a connection between the second and the third communication device PBXB,PBXC on the tnmk line TRK connecting these two communication devices PBXB,PBXC.

The second connection sublink DMC2 of the secondary connection begins at the node unit following the third communication device PBXC, hence the third connection module TB-C. Said node unit TB-C is consequently also referred to as an ingress node. From this ingress node, the third connection module TB-C, the second connection sublink DMC2 of the secondary connection is established to the called subscriber B at the latter's fifth VoIP communication terminal IPPA.

The topological embodiment of a secondary connection having being dealt with in the foregoing, the time sequence of a setup of the primary and the secondary connection will be discussed in the following on the basis of control messages exchanged.

Figure 6A:
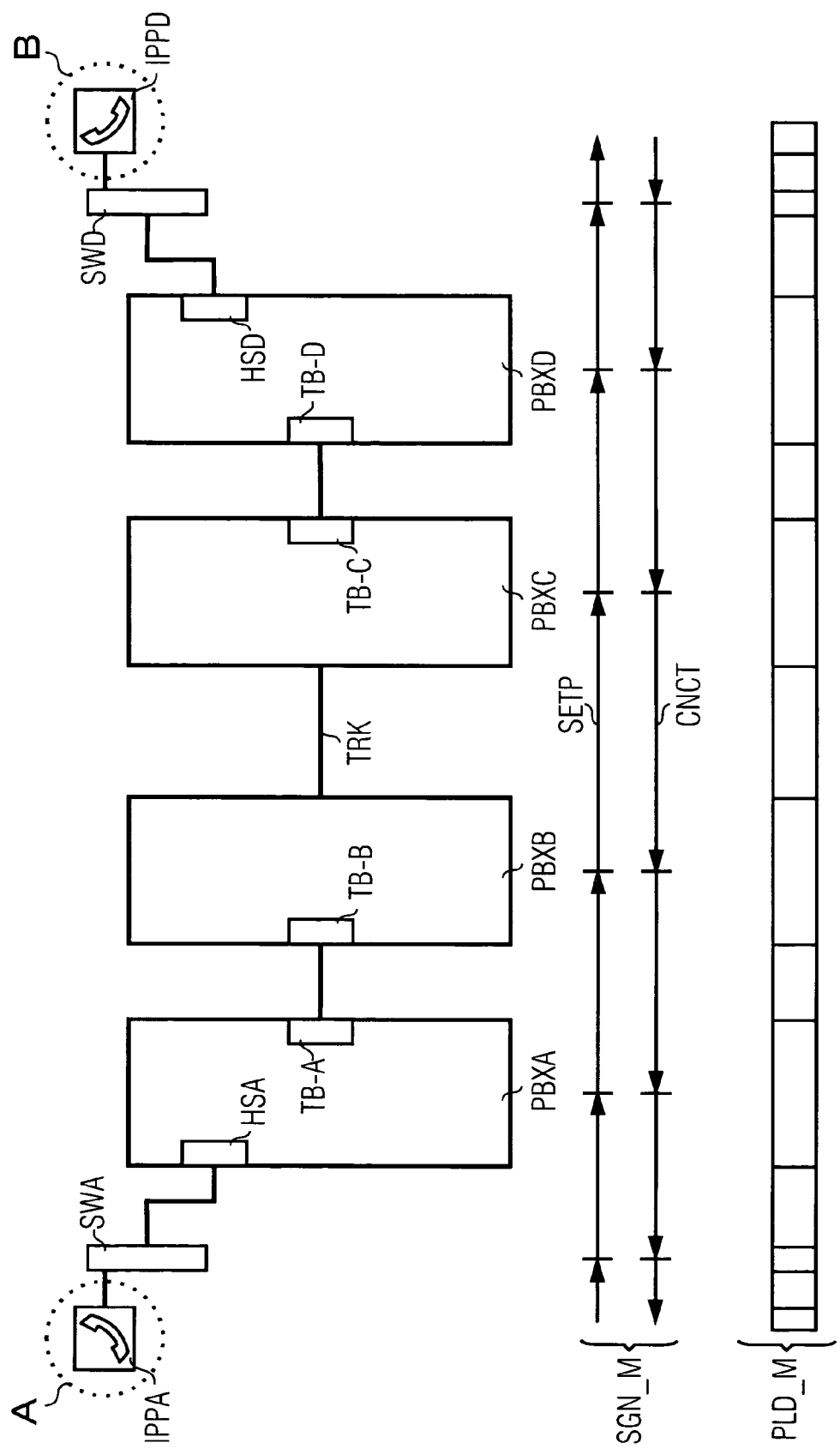
FIG. 6A: is a flow diagram for representing an exchange of control messages for the embodiment of a primary connection.

FIG. 6A shows a flow diagram for representing an exchange of control messages for the embodiment of a primary connection.

Figure 6B:
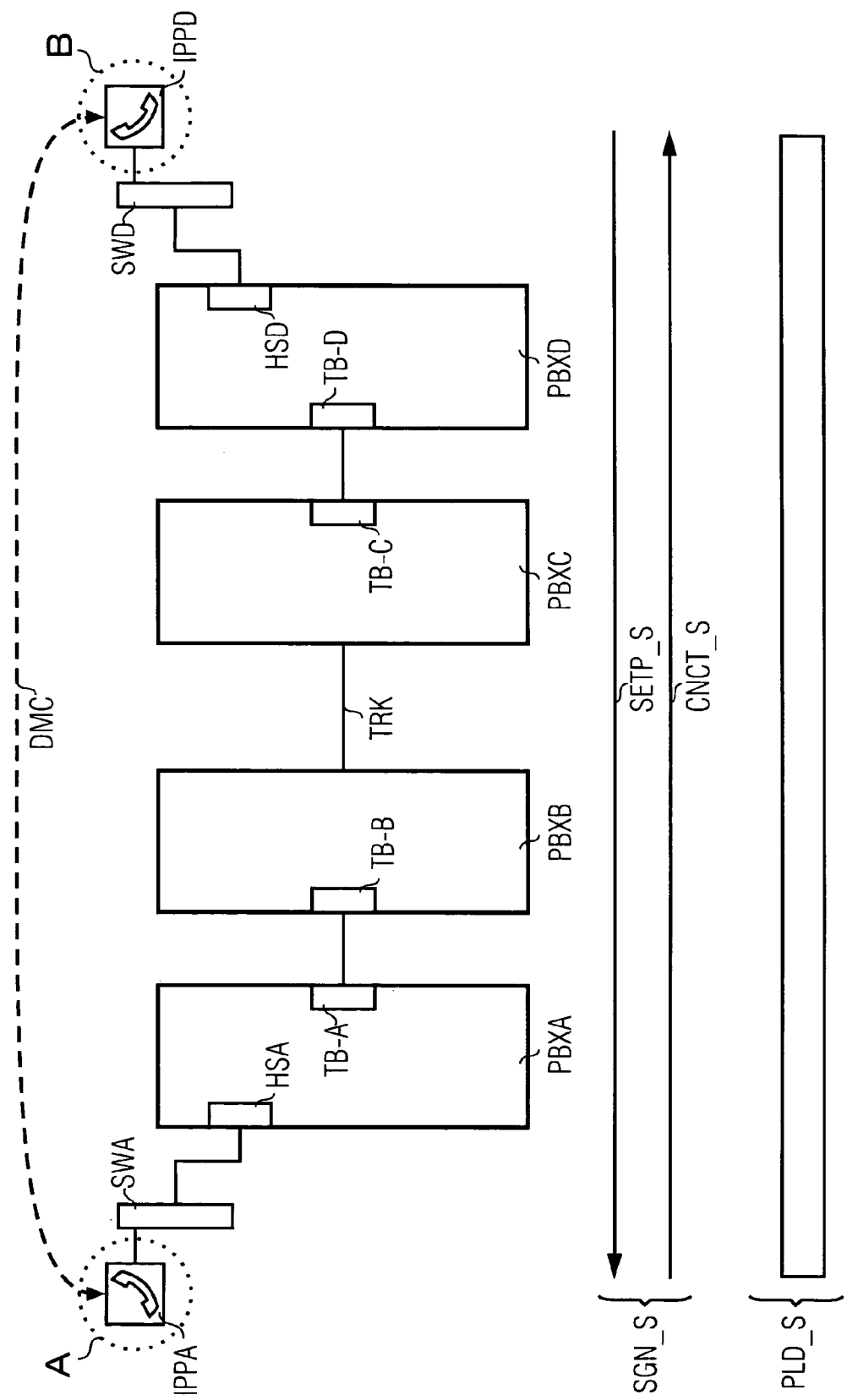
FIG. 6B: is a flow diagram for representing an exchange of control messages for the embodiment of a secondary connection.

The description with reference to FIG. 6A and the following FIG. 6B takes as its starting point a communication system according to the previously described FIG. 4, in which domain boundaries or, as the case may be, logical subnetworks play no role in the embodiment of the secondary connection. In other words, a communication system is assumed in which no connection path arrangement of the secondary connection—for instance in the form of an >>LCR configuration<<—needs to be taken into account.

In the method to be described, a communication connection is to be set up between a calling subscriber A and a called subscriber B. The calling subscriber A is located at the first VoIP communication terminal IPPA, and the called subscriber at the fourth communication terminal IPPD.

The control messages exchanged in order to set up the primary connection between the calling subscriber A and the called subscriber B are illustrated with the aid of signaling data SGN_M. User data PLD_M exchanged after the setup of the primary connection is represented in the drawing by a horizontal block subdivided by vertical lines, whereby the vertical lines at the level of the inputs and outputs (interfaces) of node units represent a conversion from packet—into circuit-oriented or, as the case may be, from circuit-into packet-oriented user data PLD_M taking place there in each case.

The signaling data SGN_M supports a control of the communication connection as well as a control of service features. The user data PLD_M—often also referred to as the >>payload<<—contains, for example, voice and/or video communication data which is transported bidirectionally by means of the communication connection.

In a circuit-oriented ISDN communication system—>>Integrated Services Digital Network<<—user data PLD_M is transmitted over one or, as the case may be, multiple basic channels or B channels as they are also called. The signaling information SGN_M is transmitted over what is known as a D channel in an ISDN communication system.

Whereas user and signaling data PLD_M, SGN_M is transmitted time-continuously in conventional ISDN-based communication systems, in packet-oriented or, as the case may be, heterogeneous communication systems it is necessary to divide the data into individual data packets provided with destination addresses in order to transmit the user and signaling data PLD_M, SGN_M via the packet-oriented network (not shown). At the exit from the packet-oriented network, the data packets are reassembled into a continuous data stream once more in the communication devices PBXA,PBXB,PBXC,PBXD.

The setup of the primary communication connection is explained below.

The method begins with the input of selection information or, as the case may be, a call number at the first VoIP communication terminal IPPA by the calling subscriber A. Following input of the complete selection information, the calling VoIP communication terminal IPPA sends a connection request message SETP which is subsequently forwarded as far as the called VoIP communication terminal IPPD. This forwarding or, as the case may be, "passing through" of the connection request message SETP is accompanied by a modification and enhancement of data contained in the connection request message SETP, which is represented in the drawing by arrows in conjunction with horizontal lines at the level of the respective node unit modifying the data of the connection request message SETP.

After being generated by the first VoIP communication terminal IPPA, the connection request message SETP is received by the first communication device PBXA and forwarded to the second communication device PBXB. At each relaying of the connection request message SETP, reference is made to configuration data of node units involved in the setup of the primary connection, in this case the first communication unit PBXA or, as the case may be, the first connection module TB-A in order to check whether the respective current node unit has a valid addressing data element for a possible secondary connection setup. In addition—cf. FIG. 7A which is to be described later—a check is carried out in each node unit to determine whether the respective current node unit is a domain boundary.

For the aforementioned and following node units it is assumed that such a setup of the secondary connection on the basis of the configuration data stored therein is permitted, for example because—in contrast to the exemplary embodiment in FIG. 7A described later—no domain boundary is present in the present exemplary embodiment.

After receiving the connection request message SETP, the second communication device PBXB forwards said message to the third communication device PBXC on the path of the trunk line TRK. After receiving the connection request message SETP, the third communication device PBXC forwards said message—following the aforementioned modification of the data contained therein—via the fourth communication device PBXD to the called VoIP communication terminal IPPD.

Following the reception of the connection request message SETP, a check is made on the part of the fourth VoIP communication terminal IPPD to determine whether a setup of the primary communication connection is possible. If the result of the check is positive—e.g. if the fourth VoIP communication terminal is not seized by another communication connection—the fourth VoIP communication terminal IPPD sends a connection confirmation message CNCT via the fourth switch SWD to the fourth communication device PBXD and from the latter to the third communication device PBXC, from where said connection confirmation message CNCT is passed through via the third communication device PBXC via the trunk line TRK to the second communication device PBXB—in a manner described analogously for the connection request message SETP. Via the second communication device PBXB, the connection confirmation message CNCT is forwarded via the first communication device PBXA and the first switch SWA finally to the first VoIP communication terminal IPPA.

Following the exchange of the last-mentioned connection request message SETP and the connection confirmation message CNCT, the primary connection between the first and the fourth VoIP communication terminal IPPA,IPPD is thus set up. An exchange of user data PLD_M now takes place on the basis of this primary connection.

If a "B-side" (relative to the called subscriber B) addressing data element is determined during the connection setup of the primary connection in relation to a valid "Aside" (relative to the calling subscriber A) addressing data element, the secondary connection setup is initiated between the node units associated with this addressing data—in the present case: the first and the fourth VoIP communication terminal IPPA,IPPD. The term "A-side" is understood to mean the node unit nearest to the calling communication unit A, and "B-side", analogously, the node unit nearest to the called communication unit B.

In an embodiment of the communication system conforming to the H.323 protocol, the secondary connection is set up according to the H.323 or, as the case may be, H.225 protocol. This direct connection request message DMC_REQ corresponds in this case to what is called a >>fast connect<< message, as provided for a fast data connection in the H.225 standard.

The use of a >>fast connect<< message means in particular that a connection between the fourth and the first VoIP communication terminal IPPD,IPPA is established on the path of a secondary connection, not—as necessary in the case of the primary connection —via individual steps.

The establishment of the associated secondary connection will be described with reference to the following figure.

FIG. 6B shows an exchange of control messages for the embodiment of the secondary connection to be set up following the primary connection according to the description with reference to FIG. 6A. Following the fully completed setup of the primary connection explained with reference to FIG. 6A, a secondary connection DMC is set up directly between the two communication endpoints, i.e. the fourth and the first VoIP communication terminal IPPD,IPPA.

With the knowledge of the respective IP addresses which were transmitted together with the control messages SETP, CNCT exchanged in connection with the primary connection, a direct, advantageously H.323-based, connection setup can be performed for the secondary connection.

The fourth VoIP communication terminal IPPD sends a connection request message SETP_S directly to the first VoIP communication terminal IPPA. Said connection request message SETP_S is transmitted via the packet-oriented network (not shown) and received at the first VoIP communication terminal IPPA.

The first VoIP communication terminal IPPA thereupon sends a connection confirmation message CNCT_S addressed to the network address of the fourth VoIP communication terminal IPPD, after the receipt of which confirmation message the secondary connection is set up. In an advantageous use of the H.323 protocol, the connection request message SETP_S and/or, as the case may be, the connection confirmation message CNCT_S are control messages embodied according to the H.225 standard.

On completion of the setup of the secondary connection DMC, user data PLD_S is exchanged on a packet-oriented basis directly between the called subscriber B and the calling subscriber A.

Figure 7A:
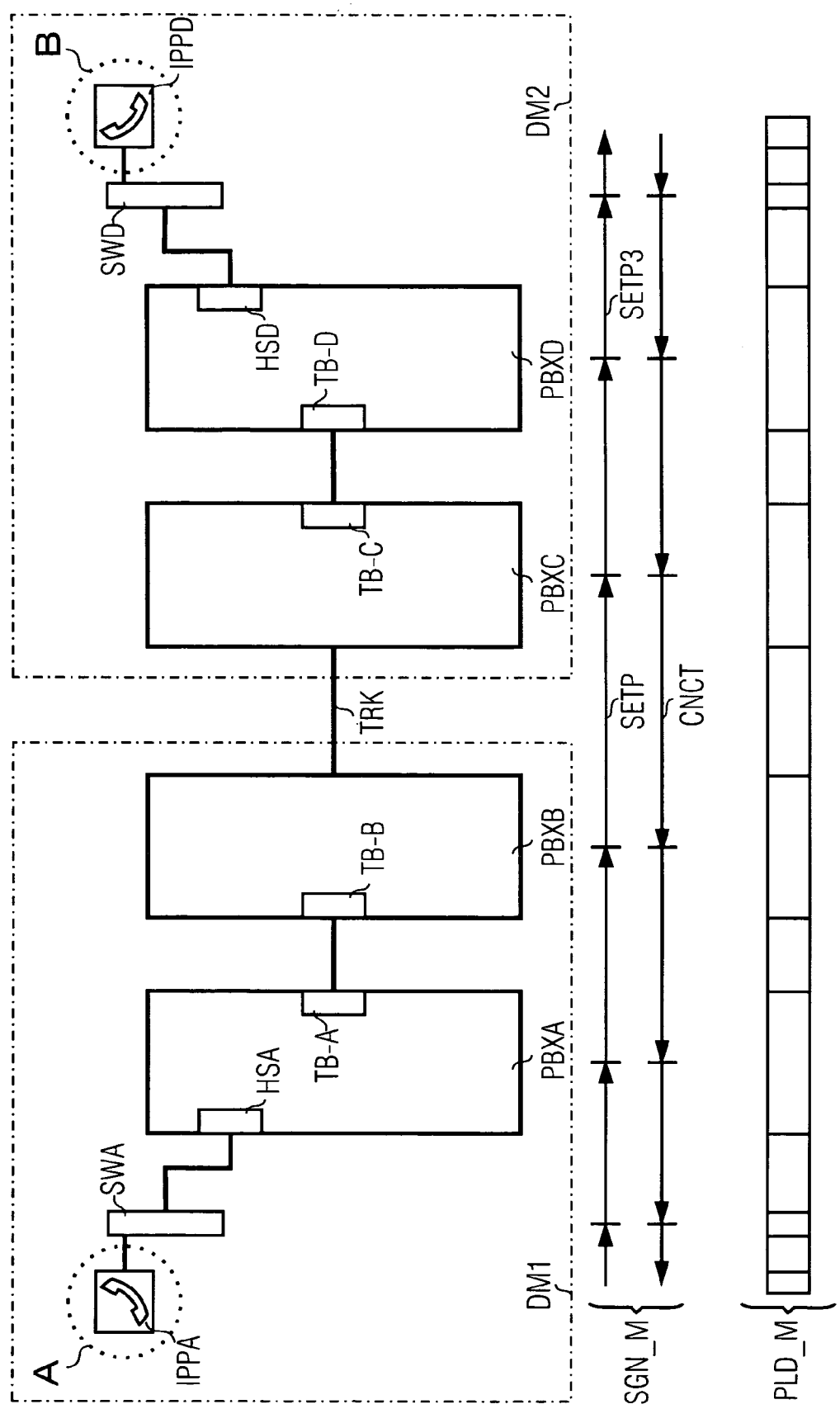
FIG. 7A: is a flow diagram for representing an exchange of control messages in a communication system subdivided into subnetworks for the embodiment of a primary connection.

FIG. 7A shows a flow diagram for representing an exchange of control messages for the embodiment of a primary connection in a communication system with a predefinable connection path arrangement.

In the description with reference to FIG. 7A, the assumed starting point is a communication system according to the previously described FIG. 5, wherein domain boundaries or, as the case may be, logical subnetworks are taken into account for the embodiment of the secondary connection. In other words, a communication system is assumed in which a connection path arrangement—for instance in the form of an >>LCR configuration<<—needs to be taken into account.

Analogously to the situation according to the description with reference to FIG. 5 and in contrast to the description with reference to FIG. 6A, the communication system is subdivided into a first and a second domain DM1,DM2.

The embodiment of the primary connection between the first and the fourth VoIP communication terminal IPPA,IPPD is realized largely identically to the embodiment described with reference to FIG. 6A, which means that reference can essentially be made to the description there for a detailed representation and only the main differences in the connection setup due to a domain boundary existing between the first and second domain DM1,DM2 are described below.

In the present exemplary embodiment, the connection request message SETP is transmitted between the domains DM1,DM2 on a circuit-oriented basis from the second communication device PBXB via the trunk line TRK to the third communication device PBXC. Apart from this, however, a circuit-oriented trunk line TRK between two node units does not necessarily have to be defined as a domain boundary. Conversely, alternatively or in addition, a domain boundary can also be defined—e.g. on account of special security requirements such as, for instance, increased security against interception—within a packet-oriented network in order, say, to prevent a secondary connection via a publicly accessible packet-oriented network.

Because of the connection path arrangement of a node unit, specifically of the second communication device PBXB, it is noted in the configuration data of this second communication device PBXB that the secondary connection may not be established via the domain boundary running after the second communication device PBXB. This aforementioned restriction is entered in a corresponding data field in the connection request message SETP and transmitted to the next node unit—in the present exemplary embodiment this is the third communication device PBXC—having a valid addressing data element in order to instruct said node unit to determine a new ingress node that is valid in its domain DM2.

The establishment of the associated secondary connection is described with reference to the following figure.

FIG. 7B shows an exchange of control messages for the embodiment of the secondary connection to be set up following the primary connection according to the description with reference to FIG. 7A.

Following the setup of the primary connection, a secondary connection is set up between the two communication endpoints, i.e. the fourth and the first VoIP communication terminal IPPD,IPPA. This time, however, the secondary connection is set up with the participation of two packet-oriented connection sublinks DMC 1,DMC2 and by means of a further circuit-oriented sublink via the trunk line TRK. In this case the packet-oriented connection sublinks DMC 1,DMC2 are embodied autonomously and independently of each other under the control of the respective ingress and egress nodes in the respective domain DM1,DM2.

A first ingress node of the secondary connection in this embodiment is the first VoIP communication terminal IPPA, whose addressing data element—in particular IP address —is transmitted in the direction of the connection request message SETP shown in FIG. 6A. This transmission of the addressing data element of the first ingress node is performed as far as a transit node at which a restriction in relation to a connection path arrangement—domain boundary—is noted in the transit node's configuration data. Said transit node corresponds to the second connection module TB-B of the second communication device PBXB as the boundary of the first domain DM1. The transit node is marked as the first egress node of a first connection sublink DMC1 of the secondary connection and the addressing data element in the connection request message SETP—shown in FIG. 6A—is marked as not valid for the following second domain DM2 by the egress node, the second connection module TB-B.

An ingress node of the secondary connection in the second domain DM2 is the third connection module TB-C of the third communication device PBXC, the addressing data element of which—in particular the IP address—is transmitted in the direction of the connection request message SETP shown in FIG. 6A. This transmission of the addressing data element of the second ingress node takes place as far as the "B-side" destination, i.e. the fourth VoIP communication terminal IPPD.

At a time at which the fourth VoIP communication terminal IPPD has sent the confirmation message CNCT for the setup of the primary connection—cf. FIG. 7A—, a packet-oriented connection DMC2 or, as the case may be, "connection sublink" of the secondary connection is set up by said fourth VoIP communication terminal IPPD in the second domain DM2 between the egress node therein—the fourth VoIP communication terminal IPPD—and the ingress node therein—the third connection module TB-C—following an exchange of a second secondary connection request message SETP_S2 and a second secondary connection confirmation message CNCT_S2.

At a subsequent time at which the second communication device PBXB has forwarded the confirmation message CNCT for the setup of the primary connection—cf. FIG. 7A—, a packet-oriented connection DMC1 or, as the case may be, "connection sublink" of the secondary connection is set up by the assigned second connection module TB-B in the first domain DM1 between the egress node therein—the second connection module TB-B —and the ingress node therein—the first VoIP communication terminal IPPA—following an exchange of a first secondary connection request message SETP_S1 and a first secondary connection confirmation message CNCT_S1.

User data exchanged between the first and fourth VoIP communication terminals IPPA,IPPD is exchanged as packet-oriented user data PLD_S on the packet-oriented connections DCM1,DCM2 and as a circuit-oriented data stream PLD_M on the trunk line TRK.

It was assumed in the description that the secondary connection is always established from the egress node—i.e. from the called communication unit or from a last node unit disposed along the primary connection and having a valid addressing data element—to the ingress node—i.e. from the calling communication unit or from a first node unit disposed along the primary connection and having a valid addressing data element. In an alternative embodiment of the invention, the secondary connection is established in an analogous manner from the ingress node to the egress node.

The invention claimed is:

1. A method for transmitting communication data in a communication system between a first communication unit and a second communication unit, comprising:
    setting up a primary connection between the first communication unit and the second communication unit via a node unit, wherein the first communication unit has a data packet address on a packet-oriented addressable network, the second communication unit has no data packet address, the node unit has a data packet address and is connected to the second communication unit through a device that converts digital signals to analog signals, and wherein the primary connection can be made through alternative paths between the first communication unit and the second communication unit through the node unit along which paths at least one conversion of a signal from analog to digital and from digital to analog occurs between the first communication unit and the node;
    transmitting, over one of the alternative paths, the data packet address of the first communication unit and the data packet address of the node unit;
    registering an ingress node on the packet-oriented addressable network, the ingress node being the first communication unit;
    registering an egress node on the packet-oriented addressable network, the egress node being the node unit;
    establishing a secondary connection between the egress and the ingress nodes via the packet-oriented addressable network for transmitting the communication data via the secondary connection such that digital signals from the first communication unit to the node are not converted to analog signals before reaching the node; and
    wherein the primary connection is maintained parallel to the secondary connection, the primary connection for carrying information related to call processing status of the first and second communication units.

2. The method according to claim 1, wherein a setup of the secondary connection starts at the egress node in an opposite direction to the primary connection.

3. The method according to claim 1, wherein a setup of the secondary connection starts at the ingress node in the direction of the primary connection.

4. The method according to claim 1, wherein the user data is exchanged exclusively between the ingress and egress nodes via the secondary connection.

5. The method according to claim 1, wherein the primary connection is established on a connection sublink between two node units or two communication units.

6. The method according to claim 1, wherein the secondary connection is established via a H.323 specification.

7. The method according to claim 1, wherein the secondary connection is established via a SIP specification.

8. The method according to claim 1, wherein a determination of whether a setup of the secondary connection is permitted beyond the node unit involved in the setup of the primary connection unit is based on a check of a configuration data for the node unit.

9. The method according to claim 8, wherein a registration selected from the group consisting of ingress node, egress node and a combination thereof is performed in accordance with the configuration data.

10. The method according to claim 1, wherein the communication system is provided for real-time communication.

11. The method according to claim 1, wherein a service feature control of the first and second communication units is implemented via a signaling data of the primary connection by a communication device assigned to a communication unit.

12. A communication system providing data transmission between a first communication unit and a second communication unit, comprising:
    a primary connection between the first communication unit and the second communication unit, wherein the first communication unit has a data-packet address on a packet-oriented addressable network and the second communication unit does not have a data-packet address on a packet-oriented addressable network;
    the connection further comprising a first addressable node unit nearest the second communication unit and having a data packet address on the packet-oriented addressable network wherein a signal passing through the primary connection is converted from analog to digital and from digital to analog between the first communication unit and the node, and;
    a secondary connection between the first communication unit and the node via the packet-oriented addressable network for transmitting the communication data via the secondary connection;
    wherein the primary connection is maintained parallel to the secondary connection to carry information related to call processing status of the first and the second communication units.

13. The system according to claim 12, wherein the secondary connection is set up starting from the node in an opposite direction to the primary connection.

14. The system according to claim 12, wherein the secondary connection is maintained after setup in addition to maintaining the primary connection, a user data is exchanged via the secondary connection.

15. A method for transmitting communication data in a communication system between a first communication unit and a second communication unit, comprising:
    setting up a primary communication path between the first communication unit and the second communication unit, wherein at least one of the first and second communication units has a data packet address on a packet-oriented addressable network;

the communication path further comprising a first node unit nearest the first communication unit and having a data packet address on the packet-oriented addressable network;

the communication path further comprising a second node unit nearest the second communication unit and having a data packet address on the packet-oriented addressable network and wherein a signal passing through the primary communication path is converted from analog to digital and from digital to analog between the first node and the second node;

transmitting solely over the communication path the data packet address of at least one of the first communication unit and the second communication units, the data packet address of the first node unit and the data packet address of the second node unit;

registering an ingress node on the packet-oriented addressable network, the ingress node selected from the group consisting of the first communication unit and the first node unit, wherein at the ingress node occurs a first necessary conversion to a packet-oriented communications data;

registering an egress node on the packet-oriented addressable network, the egress node selected from the group consisting of the second communication unit and the second node unit, wherein at the egress node occurs a last necessary conversion from the packet-oriented communication data to the communications data;

establishing a second communication path between the egress and the ingress nodes via the packet-oriented addressable network for transmitting packet-switched communication data via the secondary communication path;

wherein if the first communication unit lacks a data packet address on the packet-oriented addressable network, then a communication path between the first communication unit and the second communication unit comprises a first segment between the first communication unit and the first node unit on the primary communication path and a second segment between the first node unit, acting as the ingress node, and the egress node on the secondary communication path;

wherein if the second communication unit lacks a data packet address on the packet-oriented addressable network, then the communication path between the first communication unit and the second communication unit comprises a third segment between the second communication unit and the second node unit on the primary communication path and a fourth segment between the second node unit, acting as the egress node, and the ingress node on the secondary communication path; and wherein the primary communication path is maintained parallel to the secondary communication path to carry information related to call processing status of the first and second communication units.

* * * * *